US010024215B2

(12) United States Patent
Wakamatsu et al.

(10) Patent No.: US 10,024,215 B2
(45) Date of Patent: Jul. 17, 2018

(54) INORGANIC FIBER-FORMED ARTICLE, MAT FOR EXHAUST GAS CLEANING APPARATUS, AND EXHAUST GAS CLEANING APPARATUS

(71) Applicant: Mitsubishi Chemical Corporation, Chiyoda-ku (JP)

(72) Inventors: Toshihiro Wakamatsu, Chiyoda-ku (JP); Tomoyuki Kobayashi, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 15/558,229

(22) PCT Filed: Mar. 18, 2016

(86) PCT No.: PCT/JP2016/058771
§ 371 (c)(1),
(2) Date: Sep. 14, 2017

(87) PCT Pub. No.: WO2016/152795
PCT Pub. Date: Sep. 29, 2016

(65) Prior Publication Data
US 2018/0100421 A1    Apr. 12, 2018

(30) Foreign Application Priority Data

Mar. 23, 2015  (JP) .................................. 2015-059682
Sep. 10, 2015  (JP) .................................. 2015-178423

(51) Int. Cl.
*F01N 3/10*    (2006.01)
*F01N 3/28*    (2006.01)
(Continued)

(52) U.S. Cl.
CPC ............. *F01N 3/2853* (2013.01); *D01D 1/02* (2013.01); *D01D 4/025* (2013.01); *D01D 5/04* (2013.01);
(Continued)

(58) Field of Classification Search
CPC ............. F01N 2310/14; Y10T 442/687; Y10T 442/2008; Y10T 442/608
(Continued)

(56) References Cited

U.S. PATENT DOCUMENTS 8,999,251 B2 *  4/2015  Sasaki ...................... D01F 9/08
                                                    422/179
2007/0231222 A1  10/2007  Okabe
(Continued)

FOREIGN PATENT DOCUMENTS

EP    1 840 346 A1    10/2007
EP    2 436 890 A1    4/2012
(Continued)

OTHER PUBLICATIONS

International Search Report dated Jun. 21, 2016 in PCT/JP2016/058771, filed Mar. 18, 2016.
(Continued)

*Primary Examiner* — Tom P Duong
(74) *Attorney, Agent, or Firm* — Oblon, McClelland, Maier & Neustadt, L.L.P.

(57) ABSTRACT

An inorganic fiber-formed article, composed of a mat-shaped inorganic fiber assembly, the inorganic fiber-formed article including needle marks that extend in a direction including a thickness direction of the mat-shaped inorganic fiber assembly, where the needle marks include needle marks A and needle marks B having a diameter smaller than that of the needle marks A, dense portions in which a plurality of the needle marks A lie densely are arranged
(Continued)

apart, non-dense portions in which a needle mark density of the needle marks A is lower than that in the dense portions are present between the dense portions in both a first direction which is any mat-surface direction extending through the dense portions and a second direction orthogonal to the first direction, and the needle marks B are present at least in the non-dense portions.

19 Claims, 9 Drawing Sheets

(51) Int. Cl.
| | |
|---|---|
| *D01D 1/02* | (2006.01) |
| *D01D 7/00* | (2006.01) |
| *D01D 4/02* | (2006.01) |
| *D01D 5/04* | (2006.01) |
| *D04H 1/4209* | (2012.01) |
| *D01F 9/10* | (2006.01) |
| *D04H 1/46* | (2012.01) |
| *B01D 53/94* | (2006.01) |

(52) U.S. Cl.
CPC .................. *D01D 7/00* (2013.01); *D01F 9/10* (2013.01); *D04H 1/4209* (2013.01); *D04H 1/46* (2013.01); *B01D 53/94* (2013.01); *D10B 2101/08* (2013.01); *D10B 2505/12* (2013.01)

(58) Field of Classification Search
USPC .................................................. 422/179, 180
See application file for complete search history.

(56) References Cited

U.S. PATENT DOCUMENTS

| | | | |
|---|---|---|---|
| 2007/0254548 A1* | 11/2007 | Meadows | B32B 5/06 442/387 |
| 2009/0038129 A1 | 2/2009 | Leger | |
| 2009/0269254 A1 | 10/2009 | Yoshimi et al. | |
| 2009/0272600 A1* | 11/2009 | Okabe | D04H 1/4209 181/227 |
| 2011/0020599 A1 | 1/2011 | Le Roy et al. | |
| 2011/0151185 A1 | 6/2011 | Cree | |
| 2011/0259192 A1* | 10/2011 | Hagino | F01N 3/2853 95/273 |
| 2011/0280772 A1* | 11/2011 | Xiao | B32B 3/02 422/177 |
| 2012/0124952 A1 | 5/2012 | Uno | |
| 2012/0159914 A1 | 6/2012 | Kanaya | |

FOREIGN PATENT DOCUMENTS

| | | |
|---|---|---|
| EP | 2 471 987 A1 | 7/2012 |
| EP | 2 497 851 A1 | 9/2012 |
| JP | 2007-127112 A | 5/2007 |
| JP | 2007-162583 A | 6/2007 |
| JP | 2007-268514 A | 10/2007 |
| JP | 2007-292040 A | 11/2007 |
| JP | 2008-201125 A | 9/2008 |
| JP | 2009-264186 A | 11/2009 |
| JP | 2010-096171 A | 4/2010 |
| JP | 2011-99182 A | 5/2011 |
| JP | 2012-077399 A | 4/2012 |

OTHER PUBLICATIONS

Extended European Search Report dated Dec. 5, 2017 in Patent Application No. 16768698.9.

* cited by examiner

INORGANIC FIBER-FORMED ARTICLE, MAT FOR EXHAUST GAS CLEANING APPARATUS, AND EXHAUST GAS CLEANING APPARATUS

TECHNICAL FIELD

The present invention relates to an inorganic fiber-formed article subjected to needling. The present invention also relates to an exhaust gas cleaning mat formed of the inorganic fiber-formed article, that is, to an exhaust gas cleaning apparatus including a holding member for catalyst carriers of an exhaust gas cleaning apparatus and the mat for exhaust gas cleaning apparatuses.

BACKGROUND OF INVENTION

Formed articles of inorganic fibers typified by ceramic fibers have been used for applications exposed to high temperatures, for example, industrial heat insulators, refractory materials, and packing materials. In recent years, such formed articles have also been used as cushioning materials (catalyst-holding material) for automotive exhaust gas cleaning devices. That is, such formed articles have also been used as mats for exhaust gas cleaning, in which mats are wound around catalyst-supporting members and arranged between catalyst-supporting members and metal casings when catalyst-supporting members are accommodated in metal casings.

For example, in the case where such an inorganic fiber formed article is processed as a heat insulator or processed into an automotive catalyst-holding material (mat), needling treatment (needle punching treatment) is commonly performed in order to control the thickness and the surface density. The mat thus treated by needling have needle marks.

Patent Literatures 1 and 2 disclose that the number of needle marks per unit surface area (needle mark density) of an inorganic fiber-formed article is 100 to 5000 marks/100 $cm^2$ (1 to 5 marks/$cm^2$). Patent Literature 3 discloses that the number of needle marks per unit surface area is 2 to 20 marks/$cm^2$. Patent Literature 4 discloses that the needle mark density is preferably 50 to 250 marks/$cm^2$.

In general, needle marks are substantially uniformly distributed over the entire surface of the inorganic fiber-formed article. However, FIG. 1 in Patent Literature 4 illustrates an inorganic fiber-formed article in which needle mark rows each including needle marks that lie in a line are arranged in parallel.

Patent Literature 1: JP2007-127112A
Patent Literature 2: JP2007-268514A
Patent Literature 3: JP2008-201125A
Patent Literature 4: JP2011-99182A As described above, the thickness and surface density of the inorganic fiber-formed article are controlled by performing needling treatment on the inorganic fiber-formed article. The resilience and delamination strength of the inorganic fiber-formed article are also controlled by performing needling treatment.

Inorganic fiber-formed articles used as holding members or the like in a catalytic converter desirably have high delamination strength and also high resilience (surface pressure). However, in the inorganic fiber-formed article subjected to needling treatment, the delamination strength tends to increase and the surface pressure tends to decrease as the needle mark density increases. On the other hand, the surface pressure tends to increase and the delamination strength tends to decrease as the needle mark density decreases.

SUMMARY OF INVENTION

An object of the present invention is to provide an inorganic fiber-formed article having a high delamination strength between layers as well a high surface pressure; a mat for an exhaust gas cleaning device; and an exhaust gas cleaning device, the mat and the device using the inorganic fiber formed article.

Solution to Problem

The inorganic fiber-formed article of the present invention is an inorganic fiber-formed article formed of a mat-shaped inorganic fiber assembly. The inorganic fiber-formed article comprises needle marks that extend in a direction including a thickness direction of the mat-shaped inorganic fiber assembly, wherein the needle marks include needle marks A and needle marks B having a diameter smaller than that of the needle marks A; dense portions in which a plurality of the needle marks A lie densely are arranged apart; and non-dense portions in which a needle mark density of the needle marks A is lower than that in the dense portions are present between the dense portions in both a first direction which is any mat-surface direction extending through the dense portions and a second direction orthogonal to the first direction. The needle marks B are present at least in the non-dense portions.

The needle marks A preferably have an average diameter of 450 to 700 μm, and an average diameter of the needle marks B is preferably 35% to 65% of the average diameter of the needle marks A.

In one embodiment of the inorganic fiber-formed article of the present invention, the needle marks A are arranged in a row in the dense portions. In the embodiment, an arrangement direction of the needle marks A in each of the dense portions is preferably substantially the same. A length of each of the dense portions is preferably 2.0 to 12.0 mm on average, and a number of needle marks A in each of the dense portions is preferably 3.0 to 8.0 on average. A distance between dense portions adjacent to each other across the non-dense portions in the arrangement direction is preferably 5.0 to 25.0 mm on average, and a distance between dense portions adjacent to each other across the non-dense portions in a direction orthogonal to the arrangement direction is preferably 4.0 to 15.0 mm on average.

In one embodiment of the present invention, the needle marks B are arranged in a direction intersecting the arrangement direction of the needle marks A.

In the inorganic fiber-formed article according to another embodiment of the present invention, the dense portions spread in two directions, an area of each of the dense portions is 2.0 to 36.0 $mm^2$ on average, and a needle mark density of the needle marks A in the dense portions is 20 to 300 marks/$cm^2$ on average.

In one embodiment of the present invention, the needle marks B are present in both the dense portions and the non-dense portions.

In the inorganic fiber-formed article of the present invention, a needle mark density of the needle marks A is preferably 1.0 to 50.0 marks/$cm^2$ on an average of the entire inorganic fiber-formed article. A needle mark density of the needle marks B is preferably 1.0 to 80.0 marks/$cm^2$ on an average of the entire inorganic fiber-formed article.

The inorganic fiber-formed article of the present invention preferably has a ratio of a number of the needle marks B to a number of the needle marks A of 0.1 to 8.0 on an average of the entire inorganic fiber-formed article.

A mat for an exhaust gas cleaning apparatus of the present invention comprises the inorganic fiber-formed article of the present invention.

An exhaust gas cleaning apparatus of the present invention comprises a catalyst carrier, a casing that covers an outside of the catalyst carrier, and the mat of the present invention interposed between the catalyst carrier and the casing.

Advantageous Effects of Invention

In the inorganic fiber-formed article according to the present invention, the needle marks A are not uniformly distributed on the surface of the inorganic fiber-formed article, and dense portions in which the needle marks A lie densely in a local manner are arranged apart. In any direction extending through the dense portions, portions between the dense portions are non-dense portions of the needle marks A. The inorganic fiber-formed article according to the present invention further includes needle marks B having a small diameter. The needle marks B having a small diameter increase the delamination strength with almost no decrease in the surface pressure.

The inorganic fiber-formed article according to the present invention exhibits high delamination strength because of the dense portions of the needle marks A and the needle marks B and also exhibits high surface pressure because of the non-dense portions. Therefore, the present invention provides an inorganic fiber-formed article having both high delamination strength and high surface pressure.

BRIEF DESCRIPTION OF DRAWINGS

FIG. 1a is a plan view of an inorganic fiber-formed article according to an embodiment and FIG. 1b is a sectional view taken along line Ib-Ib in FIG. 1a.

FIG. 2 is a partially enlarged view of FIG. 1a.

DESCRIPTION OF EMBODIMENTS

Embodiments of the present invention will be described below in detail.

The inorganic fiber-formed article according to the present invention is formed of a mat-shaped inorganic fiber assembly and is subjected to needling treatment.

The inorganic fiber-formed article according to the present invention includes needle marks A and B formed through needling treatment. In other words, when needling treatment in which needles are inserted into and extracted from a mat-shaped assembly is performed, at least part of fibers is caused to extend by the needles in substantially the mat thickness direction in a portion in which the needles are inserted and extracted. Thus, needle marks are formed. The needle marks A are formed using thick needles and the needle marks B are formed using thin needles.

In the inorganic fiber-formed article according to the present invention, the needle marks A are not uniformly distributed on a mat surface, but are disposed while dense portions in which the needle marks A lie densely in a local manner are arranged apart. That is, non-dense portions are present between the dense portions in both a first direction which is any mat-surface direction extending through the dense portions and a second direction orthogonal to the first direction. The inorganic fiber-formed article according to the present invention further includes the needle marks B. The needle marks B may be arranged in a particular direction or may be uniformly disposed on the inorganic fiber-formed article.

Figure 1A:
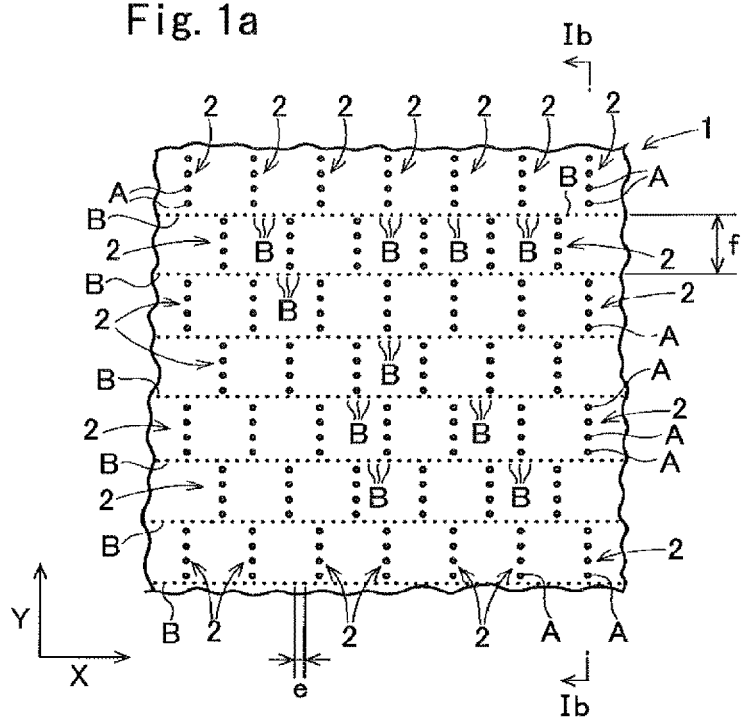
Figure 1B:
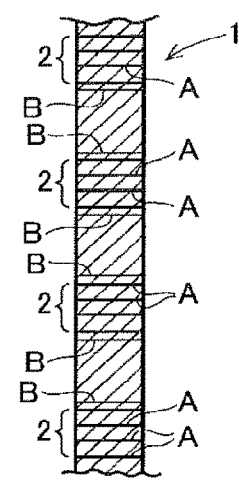
Figure 2:
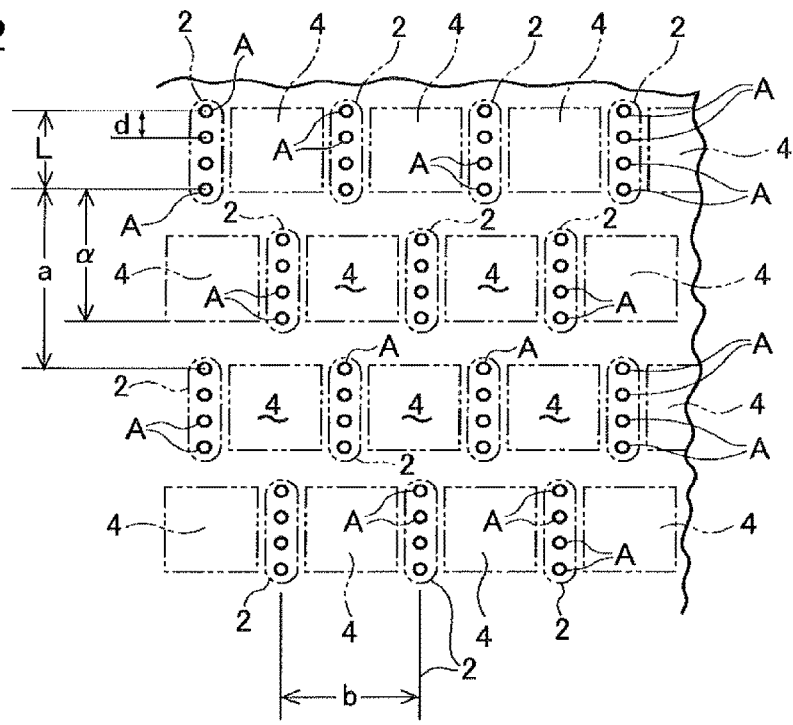

FIGS. 1a and 1b are a plan view and a sectional view illustrating an example of the inorganic fiber-formed article according to the present invention. FIG. 2 is an enlarged plan view illustrating the arrangement of the dense portions of the needle marks A in FIG. 1a. In FIG. 2, the needle marks B are not illustrated. An inorganic fiber-formed article 1 is formed of a mat-shaped inorganic fiber assembly, and includes many needle marks A that extend in the mat thickness direction and many needle marks B having a smaller diameter than the needle marks A. A plurality of needle marks A are partly provided densely to form dense portions 2 of the needle marks A. In this embodiment, all the dense portions 2 are constituted by the needle marks A arranged in a row in one direction (Y direction in FIG. 1a) extending along the mat surface.

The dense portions 2 are arranged apart in both the Y direction and an X direction orthogonal to the Y direction. That is, in both the first direction (the X direction, the Y direction, or a direction oblique to the X direction or the Y direction) which is any mat-surface direction extending through the dense portions 2 and the second direction orthogonal to the first direction, non-dense portions 4 (FIG. 2) in which the needle marks A are not densely provided are present between the dense portions 2. In this embodiment, the dense portions 2 are arranged in a staggered manner, and the non-dense portions 4 have a substantially square shape. Note that the shape of the non-dense portions 4 is not limited to the substantially square shape, and may be a substantially rectangular shape, a substantially parallelogram shape, or the like.

In this embodiment, rows of needle marks B extending in the X direction are arranged. The rows of needle marks B extend between the dense portions 2.

The dense portions 2 contribute to an increase in the delamination strength of the inorganic fiber-formed article 1. The non-dense portions 4 contribute to an increase in the resilience (surface pressure) of the inorganic fiber-formed article 1. Therefore, the inorganic fiber-formed article 1 has higher delamination strength and higher resilience than an inorganic fiber-formed article in which the needle marks A are uniformly distributed (e.g., an inorganic fiber-formed article 10 in FIG. 10) and an inorganic fiber-formed article in which long rows of the needle marks A are arranged in parallel (e.g., an inorganic fiber-formed article 11 in FIG. 11). The needle marks B increase the delamination strength with almost no decrease in the surface pressure.

Reference Examples and Comparative Examples below show that the inorganic fiber-formed article in which the dense portions of the needle marks A are formed has higher delamination strength than an inorganic fiber-formed article in which the needle marks A are uniformly distributed. The reason for this is assumed to be as follows. When the needle marks A are densely provided, needle marks A close to each other bind shared fibers. Therefore, even if the needle mark density of the needle marks A is the same, the delamination strength increases compared with the inorganic fiber-formed article in which the needle marks A are uniformly dispersed.

In the present invention, all or most of the needle marks A are arranged in the dense portions, the non-dense portions of the needle marks A are arranged between the dense portions, and fibers in the non-dense portions are not bound by the needle marks A. Thus, high surface pressure (resilience) is achieved. Therefore, the inorganic fiber-formed article according to the present invention has higher surface pressure than known inorganic fiber-formed articles in which the needle marks A are uniformly dispersed on the entire mat surface, though the needle mark density of the needle marks A is the same as that in the inorganic fiber-formed article according to the present invention. On the contrary, even when the delamination strength is increased to a delamination strength higher than that of known inorganic fiber-formed articles by increasing the average needle mark density of the needle marks A on the entire inorganic fiber-formed article according to the present invention to an average needle mark density higher than that of the known inorganic fiber-formed articles, the surface pressure can be set to a surface pressure higher than or equal to that of the known inorganic fiber-formed articles. In addition, in the present invention, the delamination strength can be increased with almost no decrease in the surface pressure by disposing the needle marks B.

According to the present invention, both the delamination strength and the surface pressure can be increased. Obviously, there can be provided an inorganic fiber-formed article having a delamination strength equal to that of known inorganic fiber-formed articles, but having a surface pressure higher than that of the known inorganic fiber-formed articles. Alternatively, there can be provided an inorganic fiber-formed article having a surface pressure equal to that of known inorganic fiber-formed articles, but having a delamination strength higher than that of the known inorganic fiber-formed articles.

Figure 11:
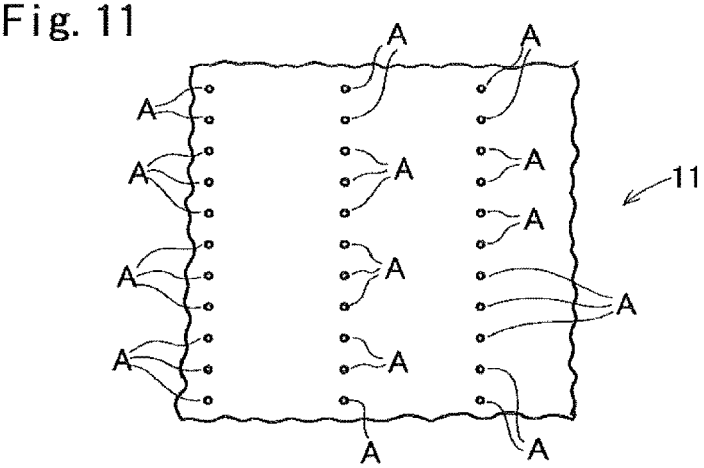
FIG. 11 is a plan view of an inorganic fiber-formed article according to Comparative Example.

As illustrated in FIG. 11, when long rows of needle marks A are arranged in parallel, belt-shaped regions including the rows of needle marks A and regions close to the rows of needle marks A have low resilience. Since the low-resilience regions extend long in parallel on the entire mat surface, the resilience of the inorganic fiber-formed article is suppressed and thus the surface pressure is believed to be not increased to that of the inorganic fiber-formed article according to the present invention. In the inorganic fiber-formed article according to the present invention, on the other hand, the non-dense portions 4 are present between the dense portions 2 even in the row direction of the dense portions 2 including rows of the needle marks A, and thus the surface pressure is believed to be increased.

In the inorganic fiber-formed article 1 in FIGS. 1a, 1b, and 2, the length L of each of the dense portions 2 is preferably 2.0 to 12.0 mm and particularly preferably 4.0 to 7.0 mm on average. The number of needle marks A in each of the dense portions 2 is preferably 2.0 to 10.0 and particularly preferably 3.0 to 8.0 on average. In this inorganic fiber-formed article, the distance d between needle marks A is preferably 0.5 to 4.0 mm and particularly preferably 1.0 to 3.0 mm on average.

In the direction (Y direction in FIG. 1a) in which the needle marks A of the dense portions 2 are arranged, the distance a between the dense portions 2 that are adjacent to each other across the non-dense portions 4 in the Y direction is normally 5.0 to 25.0 mm, preferably 5.0 to 16.0 mm, and particularly preferably 6.0 to 9.0 mm on average. The length L of the dense portions 2 may be larger or smaller than the distance a, but is preferably 2a/3 to 2a and more preferably 3a/4 to 3a/2.

The distance b between the dense portions 2 that are adjacent to each other across the non-dense portions 4 in the X direction is preferably 4.0 to 15.0 mm and particularly preferably 5.0 to 8.0 mm on average.

The pitch α of the dense portions 2 adjacent to each other in the Y direction is not particularly limited and is suitably set in accordance with the length L and distance a of the dense portions 2 so that the dense portions 2 and the non-dense portions 4 are provided.

In the dense portions 2 of the inorganic fiber-formed article 1 according to the above embodiment, the needle marks A are arranged in a row. However, the needle marks A may be arranged in two rows as in dense portions 2' of an inorganic fiber-formed article 1' according to an embodiment in FIG. 3. Alternatively, the needle marks A may be arranged in three or more rows as in dense portions 2a and 2b in FIGS. 4a and 4b. The numbers of needle marks A in rows constituting dense portions may be the same or may be different as in dense portions 2c in FIG. 4c.

Figure 4A:
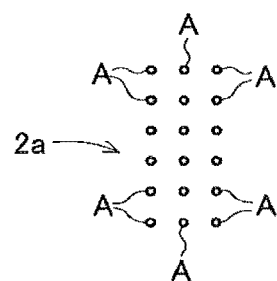
FIGS. 4a to 4f are plan views illustrating other arrangement examples of needle marks in an inorganic fiber-formed article according to an embodiment.
Figure 4B:
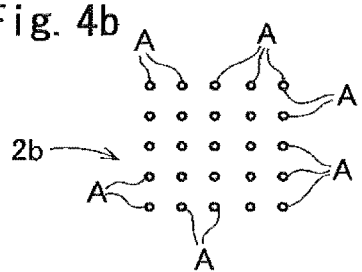
Figure 4C:
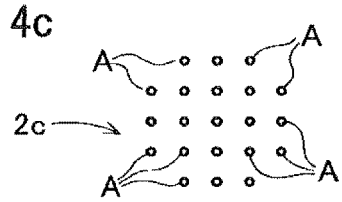
Figure 4D:
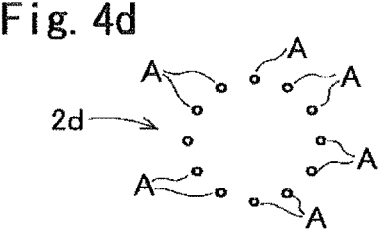
Figure 4E:
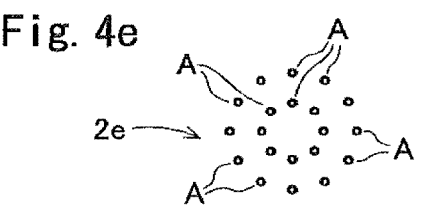

The needle marks A may be arranged at predetermined intervals in a circumferential direction as in dense portions 2d in FIG. 4d so as to form a circle. In FIG. 4d, the needle marks A are arranged so as to form a single circle. The needle marks A may be arranged so as to form two concentric circles as in dense portions 2e in FIG. 4e. Although not illustrated, the needle marks A may be arranged so as to form multiple concentric circles such as three or more concentric circles. Although not illustrated, the needle marks A may be arranged so as to form an ellipse or a polygonal ring shape or may be arranged so as to form an indented polygonal ring shape such as a star-like shape.

Figure 4F:

The needle marks A may be arranged so as to form a quadrilateral ring shape as in dense portions 2f in FIG. 4f. Other needle marks may also be present inside a region surrounded by the ring shape of the needle marks A arranged so as to form a circle.

In the inorganic fiber-formed article according to the present invention, such as the inorganic fiber-formed article 1 or 1', the needle mark density of the needle marks A, that is, the number of needle marks A per unit area (1 cm$^2$) of the mat surface is 1.0 to 50.0 marks/cm², preferably 15.0 to 40.0 marks/cm², and more preferably 20.0 to 35.0 marks/cm² on the average of the entire mat surface. The needle mark density of needle marks A in the non-dense portions 4 is preferably 3.0 marks/cm² or less, particularly preferably 0.4 marks/cm² or less, and desirably 0 marks/cm² on average.

Figure 3:
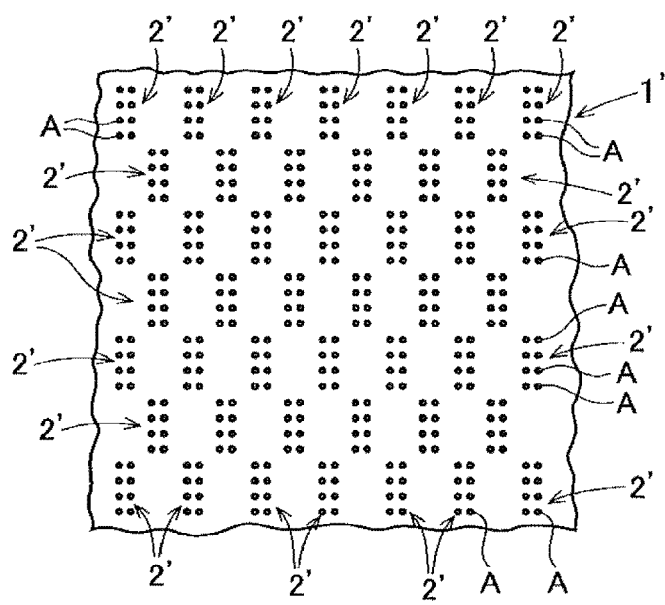
FIG. 3 is a plan view of an inorganic fiber-formed article according to another embodiment.

In the dense portions, such as the dense portions 2' and 2a to 2f in FIGS. 3 to 4f, in which the needle marks A are distributed not only in a single direction but also in two orthogonal directions, the area of a region formed by connecting outermost needle marks of each of the dense portions (e.g., the area S of a hatched region in FIG. 5 in the case of the dense portions 2a) is preferably 4.0 to 144.0 mm² and particularly preferably 9.0 to 100.0 mm² on average. The number of needle marks A in each of the dense portions is preferably 4.0 to 32.0 and particularly preferably 6.0 to 20.0 on average.

Figure 7:
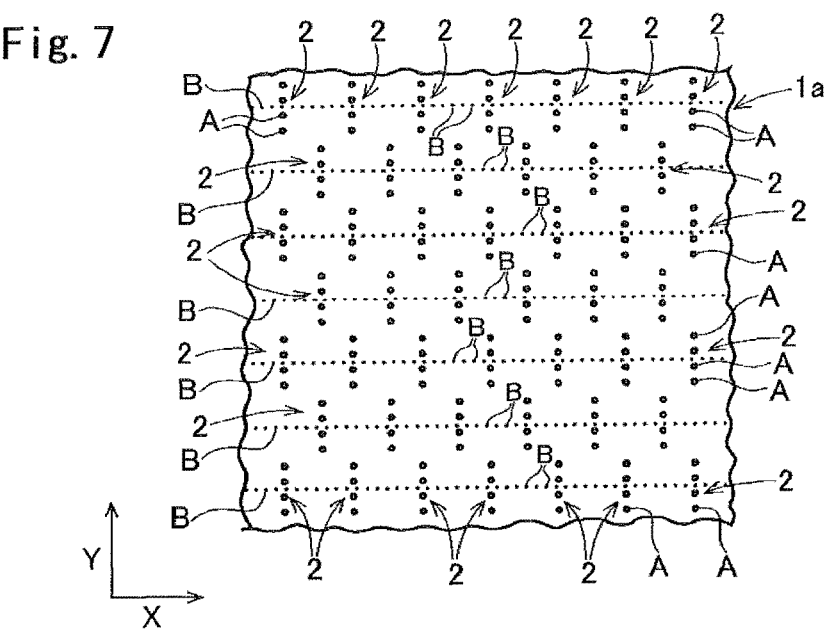
FIG. 7 is a plan view of an inorganic fiber-formed article according to an embodiment.
Figure 8:
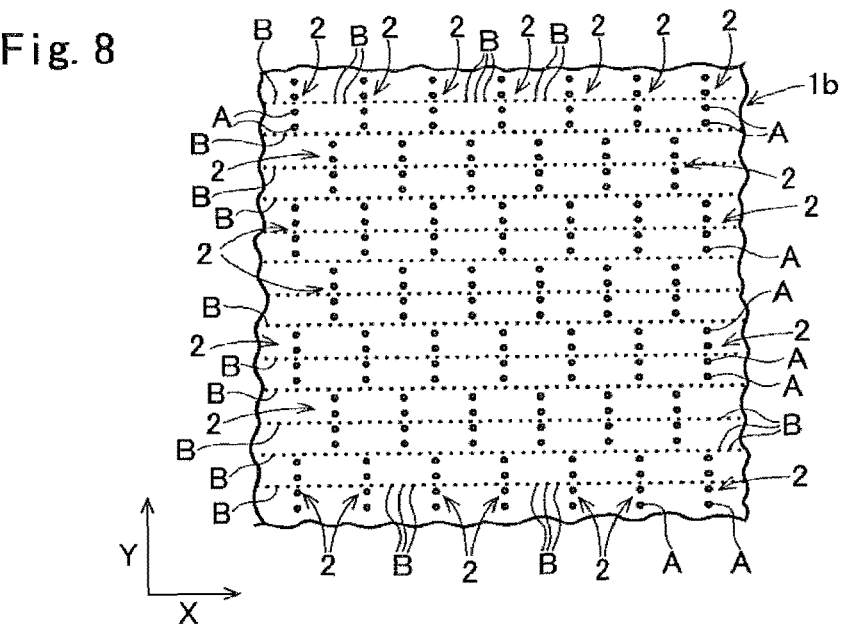
FIG. 8 is a plan view of an inorganic fiber-formed article according to an embodiment.
Figure 9:
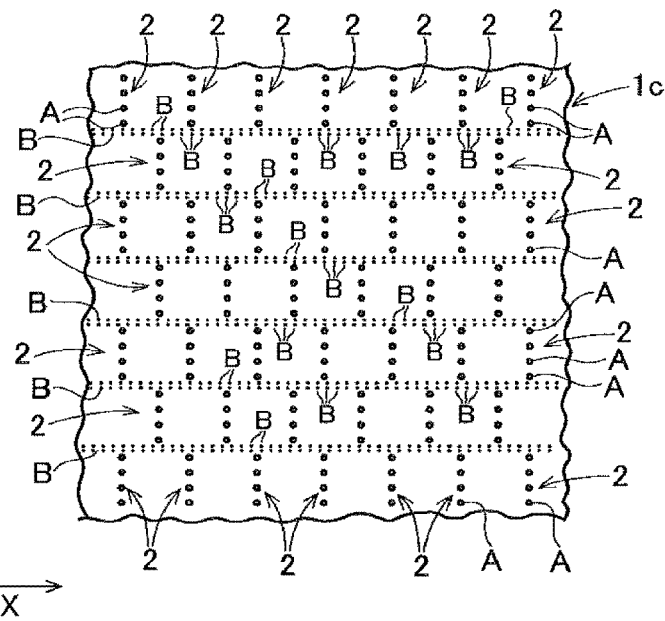
FIG. 9 is a plan view of an inorganic fiber-formed article according to an embodiment.

In the inorganic fiber-formed article 1 according to the above embodiment, the needle marks B are arranged in rows extending in the X direction between the needle mark dense portions 2. However, as in an inorganic fiber-formed article 1a in FIG. 7, the needle marks B may be arranged in rows extending in the X direction across the dense portions 2. Alternatively, as in an inorganic fiber-formed article 1b in FIG. 8, the needle marks B may be arranged in rows extending in the X direction between the dense portions 2 and extending in the X direction across the dense portions 2. As in an inorganic fiber-formed article 1c in FIG. 9, a plurality of rows of needle marks B may be arranged so as to extend in the X direction between the dense portions 2. Although not illustrated, a plurality of rows of needle marks B may be arranged so as to extend in the X direction across the dense portions 2.

Figure 13:
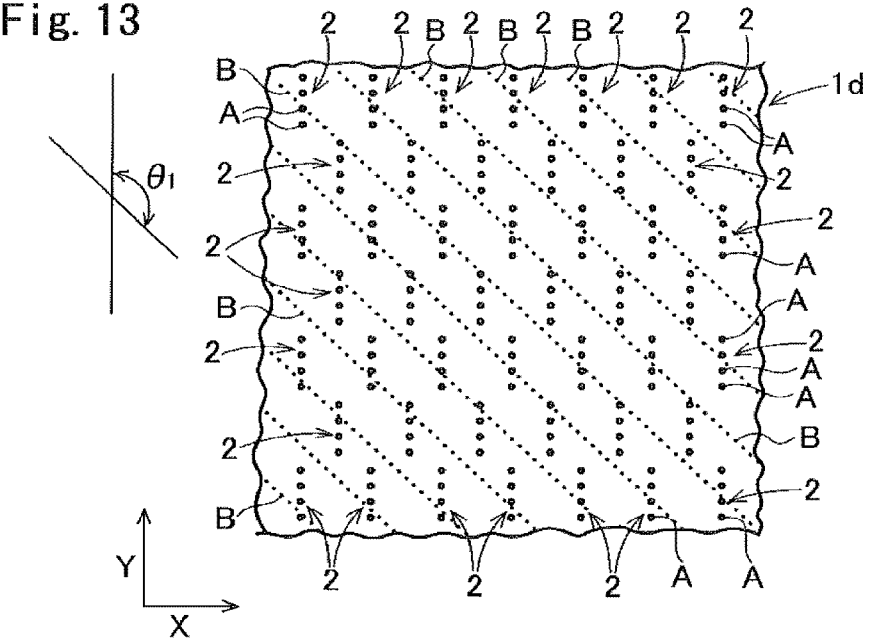
FIG. 13 is a plan view of an inorganic fiber-formed article according to an embodiment.
Figure 14:
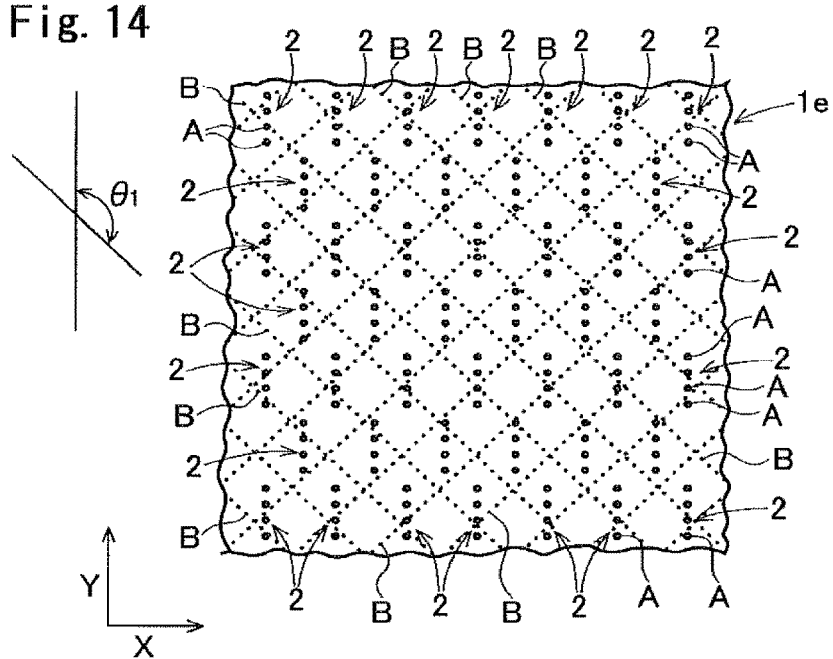
FIG. 14 is a plan view of an inorganic fiber-formed article according to an embodiment.

As in inorganic fiber-formed articles 1d and 1e in FIGS. 13 and 14, the needle marks B may be arranged in rows extending in a direction oblique to the X direction across the dense portions 2. The angle ($\theta_1$, clockwise) of the rows of needle marks B with respect to the direction (Y direction) in which the needle marks A of the dense portions are arranged is preferably 90° to 175°, more preferably 90° to 165°, and particularly preferably 90° to 150°. In FIG. 13, the needle marks B are arranged only diagonally upward to the left, but the needle marks B may be arranged only diagonally upward to the right. Alternatively, as illustrated in FIG. 14, the needle marks B may be arranged in an intersecting manner both diagonally upward to the left and diagonally upward to the right.

The rows of needle marks B are preferably arranged across a plurality of dense portions as illustrated in FIGS. 13 and 14. When the rows of needle marks B are arranged in two intersecting directions as illustrated in FIG. 14, at least some of intersection points between the rows of needle marks B preferably overlap the dense portions 2. In FIG. 14, the intersecting angle (($180-\theta_1$)×2) of the rows of needle marks B is preferably 10° to 80° and particularly preferably 30° to 60°.

The embodiments illustrated in FIGS. 1, 7, 8, 9, 13, and 14 are preferred because the binding of inorganic fibers with the needle marks B is strengthened while the area of the non-dense portions 4 is increased as much as possible.

Figure 15:
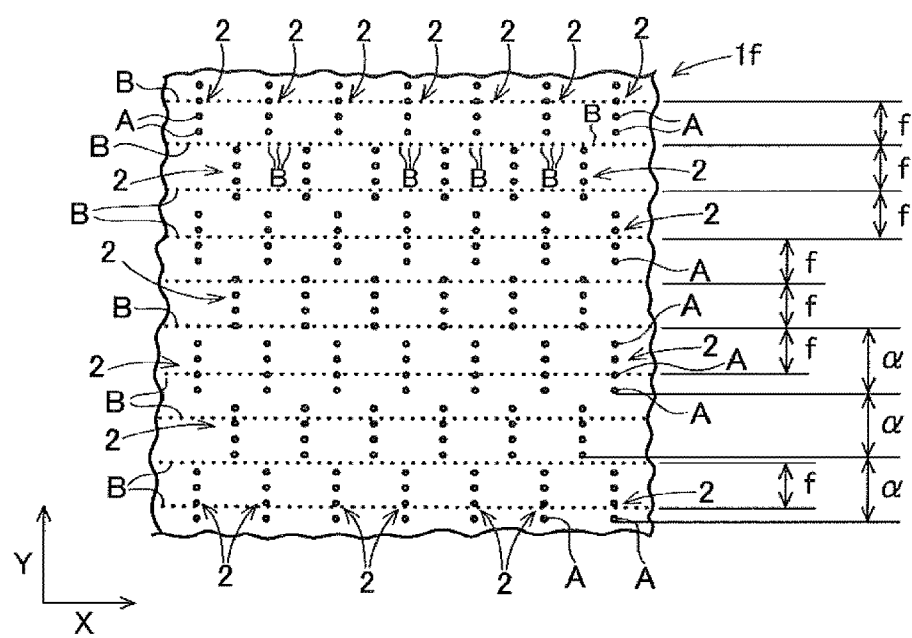
FIG. 15 is a plan view of an inorganic fiber-formed article according to an embodiment.

FIG. 15 illustrates a suitable example of the inorganic fiber-formed article according to the present invention. The arrangement pattern of the dense portions 2 in this inorganic fiber-formed article 1f is the same as that of the inorganic fiber-formed article 1 in FIGS. 1a, 1b, and 2. In each of the dense portions 2, the needle marks A are arranged in the Y direction. The suitable ranges of, for example, the number of needle marks A constituting each of the dense portions 2 and the distance b between the dense portions 2 of the needle marks A in the X direction are the same as those in FIGS. 1a, 1b, and 2. The needle marks B are arranged in the X direction.

In the inorganic fiber-formed article 1f, the pitch f of the rows of needle marks B in the Y direction is smaller than the arrangement pitch $\alpha$ of the dense portions 2 in the Y direction ($\alpha$>f). It is sufficient that the pitch f is 0.5 or more times the arrangement pitch $\alpha$. In FIG. 15, the pitch f is about 0.7 times the arrangement pitch $\alpha$. In the inorganic fiber-formed article 1 in FIG. 1, $\alpha$=f, that is, f/$\alpha$=1 is satisfied. In the present invention, f/$\alpha$ is preferably 0.5 to 1.0.

In the inorganic fiber-formed article 1f, the pitch f of the rows of needle marks B in the Y direction is smaller than the total (L+a) of the length L of the dense portions 2 and the distance a between the dense portions 2 (L+a>f). It is sufficient that the pitch f is 0.1 or more times the total L+a. In FIG. 15, the pitch f is about 0.35 times the total L+a. In the inorganic fiber-formed article 1 in FIG. 1, L+a=2f, that is, f/(L+a)=0.5 is satisfied. In the present invention, f/(L+a) is preferably 0.2 to 0.7.

In the inorganic fiber-formed article 1f, one or two rows of needle marks B intersect all the dense portions 2. In the present invention, as in the inorganic fiber-formed article 1f, one or two rows of needle marks B preferably intersect each of the dense portions 2.

In the dense portions 2 of the inorganic fiber-formed article 1f in FIG. 15, the needle marks A are arranged in a row. However, as in an inorganic fiber-formed article 1g in FIG. 16, the dense portions 2 may include needle marks A arranged in two rows. Other structures of the inorganic fiber-formed article 1g are the same as those of the inorganic fiber-formed article 1f.

Figure 16:
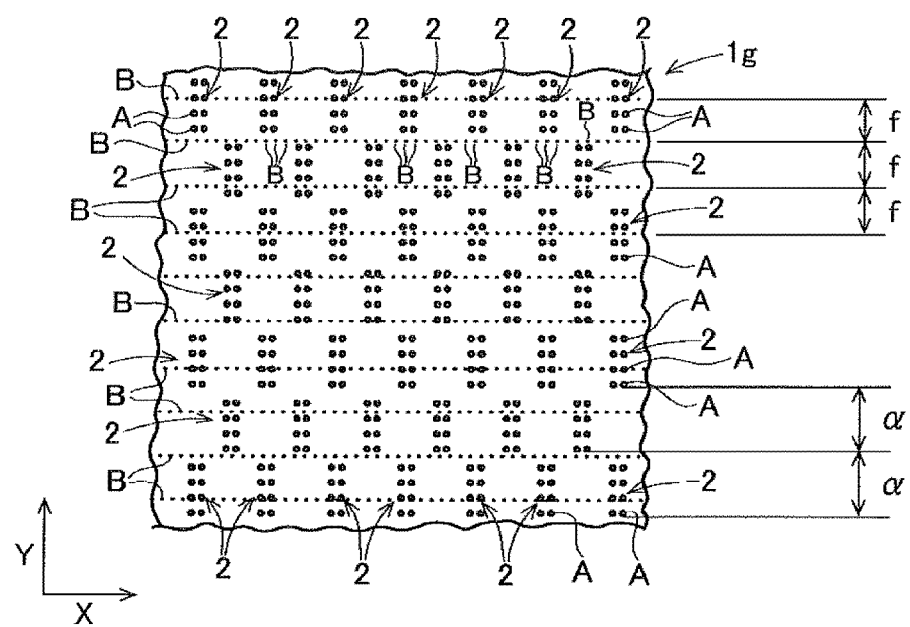
FIG. 16 is a plan view of an inorganic fiber-formed article according to an embodiment.

In the inorganic fiber-formed articles 1f and 1g in FIGS. 15 and 16, the arrangement direction of the needle marks B is the X direction, which is a direction orthogonal to the Y direction. Herein, the arrangement direction of the needle marks B may be a direction oblique to the Y direction as illustrated in FIG. 13. Alternatively, the needle marks B may be arranged in an intersecting manner both diagonally upward to the left and diagonally upward to the right as illustrated in FIG. 14. The suitable range of the intersecting angle $\theta_1$ of the needle marks B with respect to the Y direction is the same as that in FIGS. 13 and 14.

In FIGS. 1, 7, 8, 9, 13, and 14, the needle marks B are arranged in rows continuously extending in a particular direction, but may be arranged in rows that extend in a non-continuous manner.

Although not illustrated, the needle marks B may be substantially uniformly arranged on the entire inorganic fiber-formed article, that is, in both the dense portions of the needle marks A and the non-dense portions. The needle marks B may be arranged randomly.

The needle mark density of the needle marks B, that is, the number of needle marks B per 1 cm² of the mat surface is not particularly limited as long as the effect of resilience due to the non-dense portions 4 is produced, but is 1.0 to 80.0 marks/cm², preferably 3.0 to 60.0 marks/cm², and more preferably 5.0 to 40.0 marks/cm² on the average of the entire mat surface.

In the case where the needle marks B are arranged in rows continuously extending in a particular direction, the distance e between the needle marks B present in each of the rows is normally 1.0 to 10.0 mm, preferably 1.0 to 8.0 mm, more preferably 1.1 to 5.0 mm, and particularly preferably 1.2 to 3.0 mm on average.

In the case where the rows of needle marks B are arranged in parallel, the average distance (pitch) f between the rows can be appropriately designed. When the length L of the dense portions 2 is 2.0 to 12.0 mm on average, the distance (pitch) f between the rows is normally 0.5 to 15.0 mm, preferably 0.7 to 10 mm, and particularly preferably 1.0 to 7.5 mm on average.

The ratio of the number of needle marks B to the number of needle marks A per unit area (1 cm$^2$) of the mat surface is not particularly limited, but is normally 0.1 to 8.0, preferably 0.2 to 5.0, and particularly preferably 0.2 to 3.0 on the average of the entire mat surface.

In the present invention, the needle marks A and B may penetrate through the inorganic fiber-formed article 1 as illustrated in FIG. 1b. Alternatively, the needle marks A and B may extend from one mat surface so as not to reach the other mat surface as in the needle marks $A_1$ and $A_2$ of the inorganic fiber-formed article 1" in FIG. 6. The needle marks $A_1$ extend from the upper mat surface to a portion near the lower mat surface in FIG. 6. The needle marks $A_2$ extend from the lower mat surface to a portion near the upper mat surface in FIG. 6. The depth of the needle marks $A_1$ and $A_2$ is preferably 50% or more and particularly preferably 80% or more of the thickness of the mat.

In the case where the non-penetrating needle marks $A_1$ and $A_2$ are present, the number of needle marks per unit area is counted as the sum of the number of needle marks $A_1$ on one surface of an inorganic fiber-formed article cut so as to have a certain unit area and the number of needle marks $A_2$ on the other surface of the inorganic fiber-formed article.

In reality, when one of the surfaces of the inorganic fiber-formed article is irradiated with visible light, black spots attributable from both non-penetrating needle marks and penetrating needle marks are projected and appear on the other surface. Thus, the total number of penetrating needle marks and non-penetrating needle marks per unit area can be counted by counting the number of the black spots.

Figure 12:
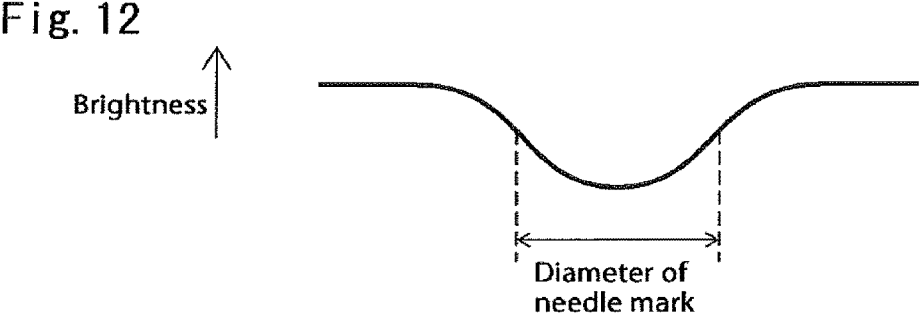
FIG. 12 is a diagram for describing a method for measuring the diameter of needle marks.

In the present invention, the diameter of the needle marks is a full width at half height of the brightness distribution (peak) measured in the diameter direction of the black spots as illustrated in FIG. 12. The diameter of the needle marks A is preferably 450 to 700 μm and particularly preferably 490 to 600 μm. The diameter of the needle marks B is preferably 35% to 65% and particularly preferably 50% to 60% of the diameter of the needle marks A, and is also preferably about 150 to 400 μm and particularly preferably about 200 to 350 μm. The diameter of the needle marks is about 50% to 80% of the diameter of a needle used for forming the needle marks.

Figure 6:
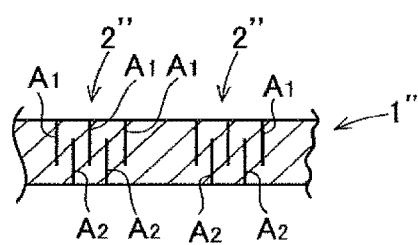
FIG. 6 is a partial sectional view of an inorganic fiber-formed article according to still another embodiment.

In FIG. 1b and FIG. 6, the needle marks A, $A_1$, $A_2$, and B extend in a direction perpendicular to the mat surface, but may be inclined ±75° with respect to the direction perpendicular to the mat surface.

<Inorganic Fibers>

Examples of the inorganic fibers included in the inorganic fiber formed article of the present invention include, but are not particularly limited to, single-component fibers and composite fibers composed of, for example, silica, alumina/silica, zirconia containing them, spinel, and titania. Alumina/silica-based fibers are preferred, and crystalline alumina/silica-based fibers are particularly preferred. The composition ratio (by weight) of alumina/silica of the alumina/silica-based fibers is preferably in the range of 60 to 95/40 to 5 and more preferably 70 to 74/30 to 26.

The inorganic fibers preferably have an average fiber diameter of 3 to 10 μm and particularly preferably 5 to 8 μm. An excessively large average fiber diameter of the inorganic fibers results in the elimination of the elasticity of the fiber aggregate. An excessively small average fiber diameter results in an increase in the amount of dust emitted into the air.

<Delamination Strength Between Layers>

The inorganic fiber formed article of the present invention preferably has a delamination strength between layers of 1.0 N or more, preferably 2.0 N or more and particularly preferably 4.0 N or more. The delamination strength is a value measured by the method identified in later-described Examples using a sample piece having a size of 50 mm×150 mm. The reason for this is that when the article is processed as a heat insulator, a reduction in workability during the formation is inhibited, and the difference in density distribution is minimized. Another reason is that when the article in the form of a mat is wound around a catalyst-supporting member and assembled in a metal casing, the interlayer displacement of the mat does not occur. A higher delamination strength of the inorganic fiber formed article is advantageous. The delamination strength is usually 30.0 N or less, preferably 25.0 N or less, and more preferably 20.0 N or less.

<Surface Density>

The surface density (mass per unit area) of the inorganic fiber formed article of the present invention is appropriately determined, depending on the application. The surface density is usually in the range of about 400 to about 3000 g/cm$^2$.

<Method for Producing Inorganic Fiber Formed Article>

A method for producing an inorganic fiber formed article according to the present invention is not particularly limited. Usually, the inorganic fiber formed article is produced by the method including a step of forming the mat-like aggregate of an inorganic fiber precursor by a sol-gel method and a step of subjecting the resulting mat-like aggregate of the inorganic fiber precursor to needling treatment. In this method, after the needling treatment, a step of firing the needled mat-like aggregate of the inorganic fiber precursor to form an inorganic fiber mat-like aggregate is performed.

While the method for producing an inorganic fiber formed article according to the present invention will be described below by exemplifying a method for producing an alumina/silica-based fiber formed article, the inorganic fiber formed article of the present invention is not limited to the alumina/silica-based fiber formed article. As described above, the formed article may be composed of silica, zirconia, spinel, titanic, or composite fibers thereof.

{Spinning Step}

To produce a mat-like aggregate of alumina/silica-based fibers by a sol-gel method, fibers are spun from a spinning solution containing basic aluminum chloride, a silicon compound, an organic polymer serving as a thickener, and water by a blowing method into an alumina/silica fiber precursor aggregate.

<Preparation of Spinning Solution>

Basic aluminum chloride $Al(OH)_{3-x}Cl_x$ can be prepared by, for example, dissolving metal aluminum in hydrochloric acid or an aqueous solution of aluminum chloride. In the chemical formula described above, the value of x is usually in the range of 0.45 to 0.54 and preferably 0.5 to 0.53. A As the silicon compound, a silica sol is preferably used. Alternatively, tetraethyl silicate or a water-soluble silicon compound, such as a water-soluble siloxane derivative, may be used. As the organic polymer, for example, a water-soluble polymer, e.g., polyvinyl alcohol, polyethylene glycol, or polyacrylamide, is preferably used. They usually have a degree of polymerization of 1000 to 3000.

With respect to the spinning solution, the ratio of aluminum originating from basic aluminum chloride to silicon originating from the silicon compound is usually 99:1 to 65:35 and preferably 99:1 to 70:30 in terms of $Al_2O_3$ and $SiO_2$ on a weight basis, the aluminum concentration is preferably in the range of 170 to 210 g/L, and the organic polymer concentration is preferably in the range of 20 to 50 g/L.

In the case where the amount of the silicon compound in the spinning solution is smaller than the range described above, alumina constituting short fibers is easily converted into α-alumina, and an increase in the size of alumina particles causes the short fibers to be easily embrittled. Meanwhile, in the case where the amount of the silicon compound in the spinning solution is larger than the range described above, the amount of silica ($SiO_2$) formed together with mullite ($3Al_2O_3 \cdot 2SiO_2$) is increased, so that the heat resistance is readily reduced.

In the case where the aluminum concentration in the spinning solution is less than 170 g/L or where the concentration of the organic polymer is less than 20 g/L, the spinning solution does not have an appropriate viscosity, thus reducing the fiber diameter of the resulting alumina/silica-based fibers. That is, an excessively large amount of free water in the spinning solution results in a low drying rate during the spinning by the blowing method, leading to excessive extension. As a result, the diameter of the spun precursor fibers is changed, failing to provide short fibers having a predetermined average fiber diameter and a sharp fiber diameter distribution. Furthermore, in the case where the aluminum concentration is less than 170 g/L, the productivity is reduced. Meanwhile, in the case where the aluminum concentration exceeds 210 g/L or where the concentration of the organic polymer exceeds 50 g/L, in either case, the viscosity is so high that the solution cannot be used as a spinning solution. The aluminum concentration in the spinning solution is preferably in the range of 180 to 200 g/L. The concentration of the organic polymer is preferably in the range of 30 to 40 g/L.

The spinning solution described above is prepared by adding the silicon compound and the organic polymer to an aqueous solution of basic aluminum chloride in amounts to satisfy the foregoing ratio of $Al_2O_3$ to $SiO_2$, and then concentrating the resulting mixture in such a manner that the aluminum concentration and the concentration of the organic polymer fall within the ranges described above.

[Spinning]

Spinning (the formation of fibers from the spinning solution) is usually performed by a blowing method in which a spinning solution is fed into a high-velocity spinning gas flow, thereby producing short-fiber alumina precursor. The structure of a spinning nozzle used in the spinning described above is not particularly limited. For example, as described in Japanese Patent No. 2602460, preferred is a structure in which an airflow emerging from an air nozzle and the flow of a spinning solution emerging from a spinning solution supply nozzle are parallel to each other and in which the parallel flow of air is sufficiently rectified and comes into contact with the spinning solution.

With respect to spinning, preferably, fibers sufficiently drawn from the spinning solution are formed under conditions in which the evaporation of water and the decomposition of the spinning solution are prevented, and then the resulting fibers are rapidly dried. To this end, the atmosphere is preferably changed from a state in which the evaporation of water is suppressed to a state in which the evaporation of water is promoted, in the course from the formation of the fibers from the spinning solution to the arrival of the fibers at a fiber collecting device.

The aggregate of the alumina/silica-based fiber precursor can be recovered in the form of a continuous sheet (thin-layer sheet) with an accumulating device having a structure in which a wire-mesh endless belt is arranged so as to be substantially perpendicular to the spinning airflow and in which the spinning airflow containing the alumina/silica-based fiber precursor impinges on the belt while the endless belt is rotated.

The thin-layer sheet recovered by the accumulating device is continuously unwind and fed to a folding device. The thin-layer sheet is folded to a predetermined width and stacked. Simultaneously, the folded sheet is continuously transferred in a direction perpendicular to a folding direction to form a laminated sheet. This arrangement of the thin-layer sheet results in the laminated sheet having a uniform weight per unit area across the entire sheet. As the foregoing folding device, a device described in Japanese Unexamined Patent Application Publication No. 2000-80547 may be used.

{Needling Treatment Step}

The mat-shaped assembly of the alumina/silica fiber precursor obtained by spinning is then subjected to needling treatment. In the present invention, this needling treatment is performed with a needle A and a needle B having a diameter smaller than that of the needle A. By using the needle A, the dense portions and non-dense portions of the needle marks A are formed. By using the needle B, the needle marks B are formed. Herein, the needling treatment with the needle A and the needle B may be performed from one surface or from both surfaces. Preferably, the needling treatment with the needle A and the needle B is performed from both surfaces. The needle A and the needle B are not particularly limited as long as the needle marks A and the needle marks B are formed in the inorganic fiber-formed article according to the present invention through the needling treatment. Thus, known needles can be used as the needles A and B. In particular, the diameters of the needles A and B are normally 1.25 to 2.0 times the diameters of the needle marks A and the needle marks B, respectively.

{Firing Step}

Firing after the needling treatment is usually performed at 900° C. or higher and preferably 1000° C. to 1300° C. A firing temperature of less than 900° C. leads to insufficient crystallization, thus providing only brittle alumina/silica-based fibers having low strength. A firing temperature exceeding 1300° C. leads to the progress of grain growth of the fibers, thereby providing only brittle alumina/silica-based fibers having low strength.

Examples of applications of the inorganic fiber formed article of the present invention include, but are not particularly limited to, various heat insulators and packing. In particular, the inorganic fiber formed article is useful as a mat for an exhaust gas cleaning device.

Preferably, the mat, such as the mat for an exhaust gas cleaning device, does not contain an organic binder. In the case where the mat contains an organic binder, the mat preferably has an organic polymer content of less than 10% by weight.

When the organic binder content of the mat is 10% by weight or more, the formation of decomposition gases, such as $NO_x$, CO, and HC, by the decomposition of the organic binder due to the high temperature of an exhaust gas at the time of engine combustion becomes problematic, which is not preferred.

In the case where an organic binder is used for the mat of the present invention, examples of the organic binder that can be used include various rubbers, water-soluble polymers, thermoplastic resins, and thermosetting resins.

Aqueous solutions, water-dispersible emulsions, latexes, and organic solvent solutions, each of which contains the foregoing organic binder serving as an active component, are commercially available. These organic binder liquids can be used as it is or diluted with, for example, water before use. Thus they can be suitably used to incorporate the organic binder into the mat. The organic binder contained in the mat may not necessarily be a single type and may be a mixture of two or more types.

Among the foregoing organic binders, preferred are synthetic rubbers, such as acrylic rubbers and nitrile rubbers; water-soluble polymers, such as carboxymethyl cellulose and polyvinyl alcohols; and acrylic resins. Among these compounds, particularly preferred are acrylic rubbers, nitrile rubbers, carboxymethyl cellulose, polyvinyl alcohols, and acrylic resins that are not included in acrylic rubbers. These binders can be preferably used because the organic binder liquids are easily prepared or available, an impregnation operation of the mat is easily performed, a sufficient binding force is exerted even at a relatively low binder content, the resulting formed article is flexible with excellent strength, and the organic binders are easily decomposed or eliminated under operating temperature conditions.

In the case where the mat of the present invention contains the organic binder, the organic binder content is preferably less than 10% by weight and particularly preferably 2.5% by weight or less.

The exhaust gas cleaning device of the present invention includes a catalyst-supporting member, a casing that covers the outside of the catalyst-supporting member, and a mat arranged between the catalyst-supporting member and the casing. As the mat, the mat of the present invention is used. The mat has high delamination strength. Thus, the mat has excellent handleability and workability in assembling the exhaust gas cleaning device, and has the ability to satisfactorily hold the catalyst-supporting member after the assembly, thereby resulting in excellent exhaust gas cleaning efficiency.

The configuration of the exhaust gas cleaning device is not particularly limited. The present invention can be applied to a typical exhaust gas cleaning device including a catalyst-supporting member, a casing, and a mat for holding the catalyst-supporting member.

EXAMPLES

While the present invention will be described more specifically below by examples and comparative examples, the present invention is not limited to these examples as long as it does not depart from the gist thereof.

Measurement and evaluation methods of various physical properties and characteristics of the resulting inorganic fiber formed article are described below.

<Delamination Strength Between Layers>

A 50 mm×150 mm square test specimen is cut out from a raw fabric of an inorganic fiber-formed article. A cut having a depth of 30 mm is made in the middle of the thickness of an end face of the test specimen. Both ends formed by the cut are held by jigs and mounted on a tensile testing machine. The average peak load (N) is measured when the test specimen is pulled in a direction perpendicular to the mat surface at a speed of 500 mm/min into two pieces.

<Method for Counting Number of Needle Marks>

Figure 5:
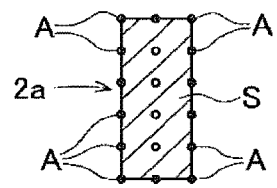
FIG. 5 is a diagram for describing the area of a dense portion.

The inorganic fiber-formed article was cut into a square having a size of 50 mm×50 mm to obtain a sample. One surface of the sample was irradiated with visible light, and the shadows of the needle marks projected on the other surface were marked with a marker pen. The number of the marked points was counted to determine the needle mark density and the number of needle marks per dense portion. Furthermore, the area of the dense portion was determined as illustrated in FIG. 5.

<Method for Measuring Diameter of Needle Marks>

The inorganic fiber-formed article was cut into a square having a size of 50 mm×50 mm to obtain a sample. One surface of the sample was irradiated with visible light, and the other surface was photographed with a CCD camera. For the shadows of the needle marks, a brightness distribution chart was made as illustrated in FIG. 12. The full width at half height was determined and defined as the diameter of the needle marks. The diameter of the needle marks A was set in the range of 450 to 700 µm, and the diameter of the needle marks B was set in the range of 150 to 400 µm. The average diameters of the needle marks A and the needle marks B were determined.

In Examples, the needle marks A had an average diameter of 560 µm and the needle marks B had an average diameter of 300 µm.

<Surface Pressure>

A sample having a size of 50 mm×50 mm was cut out from the whole cloth. The sample was compressed at 1 mm/min using a universal testing machine. When the sample density reached 0.3 g/cm$^3$, the sample was held for 15 seconds. The load (N) after 15 seconds was measured, and divided by 2500 mm$^2$ (2500×10$^{-6}$ m$^2$) to calculate the surface pressure (kPa).

Examples 1

A silica sol was added to an aqueous solution of basic aluminum chloride (aluminum content: 70 g/L, Al/Cl=1.8 (atomic ratio)) in such a manner that an ultimately obtained alumina fiber composition satisfied Al$_2$O$_3$:SiO$_2$=72:28 (ratio by weight). After a polyvinyl alcohol was added thereto, the mixture was concentrated to prepare a spinning solution having a viscosity of 40 poise and an alumina-silica content of about 30% by weight. Fibers were spun from the spinning solution by a blowing method. The resulting fibers were collected to form a mat-like aggregate of an alumina/silica-based fiber precursor. The mat-like aggregate was subjected to needle punching at a needling pattern described in FIG. 1 a using needles A and needles B having almost a half diameter of the needles A and then fired at 1200° C. to form a long mat-like crystalline alumina/silica-based fiber formed article (fired fibers) (hereinafter, also referred to as a "raw fabric") having a width of 600 mm, and a thickness of 7.3 mm. Needle marks A are formed by the needles A, and needle marks B are formed by the needles B.

The composition ratio of the resulting crystalline alumina/silica-based fibers was alumina/silica=72/28 (ratio by weight). The average fiber diameter (average value of 100 fibers) of the crystalline alumina/silica-based fibers was measured by the observation of the mat-like aggregate with a microscope and found to be 5.5 µm.

For the obtained whole cloth, the delamination strength, the surface pressure, the average needle mark densities of the needle marks A and B on the entire mat surface, the length L of the dense portions 2, the distances a, b, and a between the dense portions 2 (FIG. 2), the number of needle marks A per single dense portion 2, the distance e between the needle marks B, and the pitch f of the rows of needle marks B were measured. Table 1 shows the results. Herein, the length L of the dense portions 2, the distances a, b, and a between the dense portions 2, the number of needle marks A per single dense portion 2, the distance e between the needle marks B, and the pitch f of the rows of needle marks B are averages in the sample (50 mm×50 mm).

Example 2

A whole cloth of the inorganic fiber-formed article was produced in the same manner as in Example 1, except that, by setting the distance e between the needle marks B to 1.9 mm and setting the pitch f of the needle marks B to 4.8 mm, the needle mark density of the needle marks B was increased to 1.5 times that in Example 1 so that a needle mark pattern similar to that in FIG. 15 was formed. Table 1 shows the measurement results of the characteristics and the like.

Example 3

A whole cloth of the inorganic fiber-formed article was produced in the same manner as in Example 1, except that, by changing the direction of the needle marks B to an oblique direction as illustrated in FIG. 13 ($\theta_1$=135°), setting the distance e between the needle marks B to 2.0 mm, and setting the pitch f of the needle marks B to 3.9 mm, the needle mark density of the needle marks B was increased to 2.0 times that in Example 1. Table 1 shows the measurement results of the characteristics and the like.

Example 4

A whole cloth of the inorganic fiber-formed article was produced in the same manner as in Example 2, except that, by setting the distance e between the needle marks B to 1.7 mm and setting the pitch f of the needle marks B to 2.9 mm, the needle mark density of the needle marks B was increased to 3.2 times that in Example 1. Table 1 shows the measurement results of the characteristics and the like.

Example 5

A whole cloth of the inorganic fiber-formed article was produced in the same manner as in Example 3, except that, by changing the direction of the needle marks B to an oblique direction as illustrated in FIG. 13 ($\theta_1$=135°), setting the distance e between the needle marks B to 2.0 mm, and setting the pitch f of the needle marks B to 2.0 mm, the needle mark density of the needle marks B was increased to 4.1 times that in Example 1. Table 1 shows the measurement results of the characteristics and the like.

Example 6

A whole cloth of the inorganic fiber-formed article was produced in the same manner as in Example 2, except that, by setting the distance e between the needle marks B to 1.7 mm and setting the pitch f of the needle marks B to 1.4 mm, the needle mark density of the needle marks B was increased to 6.5 times that in Example 1. Table 1 shows the measurement results of the characteristics and the like.

Comparative Example 1

Figure 10:
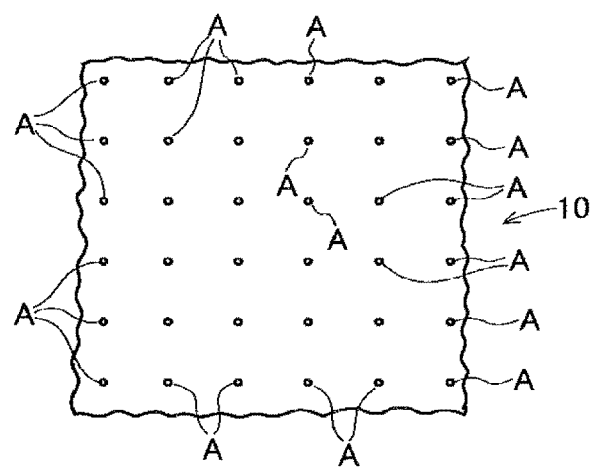
FIG. 10 is a plan view of an inorganic fiber-formed article according to Comparative Example.

An inorganic fiber-formed article 10 illustrated in FIG. 10 was produced in the same manner as in Example 1, except that the needle marks A were uniformly dispersed on the entire mat surface as illustrated in FIG. 10 while the needle mark density of the needle marks A was the same as that in Example 1. Table 1 shows the measurement results of the characteristics and the like.

Reference Example 1

A whole cloth of the inorganic fiber-formed article was produced in the same manner as in Example 1, except that the needle mark density of the needle marks A was changed to about 50% of that in Example 1 and the needle marks B were not disposed. Table 1 shows the measurement results of the characteristics and the like.

Comparative Example 2

An inorganic fiber-formed article 10 illustrated in FIG. 10 was produced in the same manner as in Comparative Example 1, except that the needle marks were uniformly dispersed on the entire mat surface as illustrated in FIG. 10 while the needle mark density of the needle marks A was the same as that in Reference Example 1. Table 1 shows the measurement results of the characteristics and the like.

TABLE 1

| | Average density of needle marks A on entire mat surface ($cm^2$) | Average density of needle marks B on entire mat surface ($cm^2$) | Ratio of number of needle marks B to number of needle marks A on entire mat surface | Number (average) of needle marks A in each dense portion of needle marks A (marks) | Length L (average) of each dense portion of needle marks A (mm) | Distance (average) between dense portions of needle marks (mm) | | |
|---|---|---|---|---|---|---|---|---|
| | | | | | | a | b | α |
| Example 1 | 34.7 | 7.3 | 0.21 | 5.0 | 7.0 | 6.5 | 6.0 | 6.75 |
| Example 2 | 34.7 | 11.0 | 0.32 | 5.0 | 7.0 | 6.5 | 6.0 | 6.75 |
| Example 3 | 34.7 | 12.9 | 0.37 | 5.0 | 7.0 | 6.5 | 6.0 | 6.75 |
| Example 4 | 34.7 | 20.4 | 0.59 | 5.0 | 7.0 | 6.5 | 6.0 | 6.75 |
| Example 5 | 34.7 | 25.7 | 0.74 | 5.0 | 7.0 | 6.5 | 6.0 | 6.75 |
| Example 6 | 34.7 | 40.8 | 1.18 | 5.0 | 7.0 | 6.5 | 6.0 | 6.75 |
| Comparative Example 1 | 34.7 | 7.3 | — | — | — | — | — | — |
| Reference Example 1 | 17.1 | — | — | 4.0 | 6.0 | 10.0 | 6.0 | |
| Comparative Example 1 | 17.1 | 7.3 | — | — | — | — | — | — |

TABLE 1-continued

|  | Number (average) of needle marks A in non-dense portions of needle marks | Distance (average) e between needle marks B present in the same row (mm) | Pitch (average) f of needle marks B | Intersecting angle $\theta_1$ between Y direction and row direction of needle marks B (°) | Delamination strength (N) | Surface pressure (kPa) |
|---|---|---|---|---|---|---|
| Example 1 | 0 | 2.8 | 4.9 | 90 | 5.3 | 205 |
| Example 2 | 0 | 1.9 | 4.8 | 90 | 5.5 | 204 |
| Example 3 | 0 | 2.0 | 3.9 | 135 | 7.3 | 215 |
| Example 4 | 0 | 1.7 | 2.9 | 90 | 11.8 | 207 |
| Example 5 | 0 | 2.0 | 2.0 | 135 | 13.2 | 202 |
| Example 6 | 0 | 1.7 | 1.4 | 90 | 20.0 | 200 |
| Comparative Example 1 | — | 2.8 | 4.9 | 90 | 3.4 | 194 |
| Reference Example 1 | 0 | — | — | — | 2.3 | 223 |
| Comparative Example 1 | — | 2.8 | 4.9 | 90 | 2.0 | 209 |

As is clear from Table 1, the inorganic fiber-formed articles in Examples 1 to 6 have higher delamination strength than those in Comparative Examples 1 and 2 in which the needle marks B are not disposed. The inorganic fiber-formed articles in Examples 1 to 6 also have a surface pressure higher than or substantially equal to that in Comparative Examples 1 and 2. Furthermore, the delamination strength and the surface pressure are higher in Reference Example 1 than in Comparative Example 2 in which the density of the needle marks A is equal to that in Reference Example 1. This shows that the needle marks A are desirably disposed so that the dense portions and the non-dense portions are formed without uniformly disposing the needle marks A.

While the present invention has been described by the specific embodiments, it will be obvious to those skilled in the art that various changes may be made without departing from the intention and scope of the invention.

This application is based on Japanese Patent Application No. 2015-059682 filed Mar. 23, 2015, and Japanese Patent Application No. 2015-178423 filed Sep. 10, 2015 which is hereby incorporated by reference herein in its entirety.

REFERENCE SIGNS LIST 1, 1', 1", 1a-1g, 10, 20 inorganic fiber formed article
2, 2', 2a-2f dense portion
4 non-dense portion

The invention claimed is:

1. An inorganic fiber-formed article, comprising a mat-shaped inorganic fiber assembly, the inorganic fiber-formed article comprising:
   needle marks that extend in a direction including a thickness direction of the mat-shaped inorganic fiber assembly,
   wherein
   the needle marks include needle marks A and needle marks B having a diameter smaller than that of the needle marks A,
   dense portions in which a plurality of the needle marks A lie densely are arranged apart,
   non-dense portions in which a needle mark density of the needle marks A is lower than that in the dense portions are present between the dense portions in both a first direction which is any mat-surface direction extending through the dense portions and a second direction orthogonal to the first direction, and
   the needle marks B are present at least in the non-dense portions.

2. The inorganic fiber-formed article according to claim 1, wherein the needle marks A have an average diameter of 450 to 700 μm, and an average diameter of the needle marks B is 35% to 65% of the average diameter of the needle marks A.

3. The inorganic fiber-formed article according to claim 1, wherein the needle marks A are arranged in a row or in two rows in the dense portions.

4. The inorganic fiber-formed article according to claim 3, wherein an arrangement direction of the needle marks A in each of the dense portions is substantially the same.

5. The inorganic fiber-formed article according to claim 4, wherein a length of each of the dense portions is 2.0 to 12.0 mm on average, and a number of needle marks A in each of the dense portions is 3.0 to 8.0 on average.

6. The inorganic fiber-formed article according to claim 4, wherein a distance (distance a) between dense portions adjacent to each other across the non-dense portions in the arrangement direction is 5.0 to 25.0 mm on average, and a distance (distance b) between dense portions adjacent to each other across the non-dense portions in a direction orthogonal to the arrangement direction is 4.0 to 15.0 mm on average.

7. The inorganic fiber-formed article according to claim 4, wherein an arrangement pitch f of the needle marks B in the arrangement direction (Y direction) of the needle marks A in the dense portions is 0.5 to 1 time an arrangement pitch α of the dense portions in the Y direction.

8. The inorganic fiber-formed article according to claim 4, wherein the needle marks B are arranged in a direction intersecting the arrangement direction of the needle marks A.

9. The inorganic fiber-formed article according to claim 8, wherein an intersecting angle $\theta_1$ between the direction in which rows of the needle marks B are arranged and the arrangement direction (Y direction) of the needle marks A is 90° to 175°.

10. The inorganic fiber-formed article according to claim 8, wherein an intersecting angle $\theta_1$ between the direction in which rows of the needle marks B are arranged and the arrangement direction of the needle marks A is more than 90° and less than 175°.

11. The inorganic fiber-formed article according to claim 10, wherein the rows of the needle marks B are arranged in two intersecting directions.

12. The inorganic fiber-formed article according to claim 1, wherein one or two rows of the needle marks B intersect each of the dense portions.

13. The inorganic fiber-formed article according to claim 1, wherein the dense portions spread in two directions, an area of each of the dense portions is 2.0 to 36.0 mm$^2$ on average, and a needle mark density of the needle marks A in the dense portions is 20 to 300 marks/cm$^2$ on average.

14. The inorganic fiber-formed article according to claim 1, wherein the needle marks B are present in both the dense portions and the non-dense portions.

15. The inorganic fiber-formed article according to claim 1, wherein a needle mark density of the needle marks A is 1.0 to 50.0 marks/cm$^2$ on an average of the entire inorganic fiber-formed article.

16. The inorganic fiber-formed article according to claim 1, wherein a needle mark density of the needle marks B is 1.0 to 80.0 marks/cm$^2$ on an average of the entire inorganic fiber-formed article.

17. The inorganic fiber-formed article according to claim 1, wherein a ratio of a number of the needle marks B to a number of the needle marks A is 0.1 to 8.0 on an average of the entire inorganic fiber-formed article.

18. A mat, the mat comprising the inorganic fiber-formed article according to claim 1.

19. An exhaust gas cleaning apparatus comprising a catalyst carrier, a casing that covers an outside of the catalyst carrier, and a mat interposed between the catalyst carrier and the casing, wherein the mat is the mat according to claim 18.

* * * * *